(12) United States Patent
Anderson et al.

(10) Patent No.: US 8,108,677 B2
(45) Date of Patent: Jan. 31, 2012

(54) METHOD AND APPARATUS FOR AUTHENTICATION OF SESSION PACKETS FOR RESOURCE AND ADMISSION CONTROL FUNCTIONS (RACF)

(75) Inventors: Thomas Wayne Anderson, Naperville, IL (US); Igor Faynberg, East Brunswick, NJ (US); Hui Lan Lu, Marlboro, NJ (US); Zachary Zeltsan, Bronx, NY (US)

(73) Assignee: Alcatel Lucent, Paris (FR)

( * ) Notice: Subject to any disclaimer, the term of this patent is extended or adjusted under 35 U.S.C. 154(b) by 1175 days.

(21) Appl. No.: 11/823,620

(22) Filed: Jun. 27, 2007

(65) Prior Publication Data
US 2008/0098228 A1 Apr. 24, 2008

Related U.S. Application Data

(60) Provisional application No. 60/852,865, filed on Oct. 19, 2006.

(51) Int. Cl.
*H04L 9/32* (2006.01)
*H04L 29/06* (2006.01)

(52) U.S. Cl. ............. 713/172; 713/159; 726/2; 726/3
(58) Field of Classification Search .............. 726/2–10; 713/159, 172
See application file for complete search history.

(56) References Cited

U.S. PATENT DOCUMENTS

| | | | |
|---|---|---|---|
| 6,965,674 B2 * | 11/2005 | Whelan et al. | 380/270 |
| 2001/0047484 A1 * | 11/2001 | Medvinsky et al. | 713/201 |
| 2004/0123109 A1 * | 6/2004 | Choi | 713/176 |
| 2004/0255037 A1 * | 12/2004 | Corvari et al. | 709/229 |
| 2005/0154889 A1 * | 7/2005 | Ashley et al. | 713/171 |
| 2006/0269066 A1 * | 11/2006 | Whitehead et al. | 380/270 |

* cited by examiner

*Primary Examiner* — Benjamin Lanier
(74) *Attorney, Agent, or Firm* — M. J. Hodulik

(57) ABSTRACT

The invention that addresses the problem of authentication of the transport packet stream (which constitutes a flow within a session), which has been admitted into a managed packet network. Authentication and the subsequent policing of the flows supporting an identified client's authorized service prevent a large class of denial of service attacks described below. Specifically, the invention addresses two different matters: 1) key distribution and management 2) various forms of using a shared key for the authentication of transport packets on the user-to-network-interface (UNI).

12 Claims, 2 Drawing Sheets

Pull Model

Pull Model

Push Model

METHOD AND APPARATUS FOR AUTHENTICATION OF SESSION PACKETS FOR RESOURCE AND ADMISSION CONTROL FUNCTIONS (RACF)

CROSS-REFERENCE TO RELATED APPLICATION

This application claims priority of Provisional Application Ser. No. 60/852,865 which was filed Oct. 19, 2006.

TECHNICAL FIELD

This invention relates generally to the authentication of a transport packet stream (which constitutes a flow within a session), which has been admitted into a managed packet network.

BACKGROUND OF THE INVENTION

In the past years, the telecommunications industry has been solving several inter-related problems in the converged (both mobile and fixed) networks:

1. Establishment of a user session in a managed IP network;
2. Policy-based admission control; and
3. Policy enforcement.

The first item above, user session establishment, addresses signaling between an end point (i.e., user equipment terminal) and the network in order to establish an end-to-end session (such as a Voice-over-IP telephone call or a conference call, or an IP TV session). Policy-based admission control refers to the process triggered during session establishment, in which the network itself is determining whether there are sufficient resources (i.e., bandwidth) in the network to admit the relevant IP flows (defined by the quintuple that contains the originating and terminating IP addresses and originating and terminating port numbers along with the protocol identifier); if such resources are found and the request is authorized as legitimate, the network instructs the appropriate devices at its edges to admit the authorized flows (and, in the most general case, ensure that they conform to specific policies). Policy enforcement deals with actual admission of the traffic from end points. The IP Multimedia Subsystem (IMS), ETSI TS 123 002 V7.1.0 (2006-03), Digital cellular telecommunications system (Phase 2+); Universal Mobile Telecommunications System (UMTS); Network Architecture and ETSI TS 123 228 V7.3.0, (2006-03), Digital cellular telecommunications system (Phase 2+); Universal Mobile Telecommunications System (UMTS); IP Multimedia Subsystem (IMS); Stage 2, has defined an architecture and a set of standards that support the implementation of the above functions. Subsequently, this has been further elaborated within the framework of a more general architecture presently developed by ITU-T within the framework of Resource Admission and Control Functions known as ITU-T New Draft Recommendation Y.2111 (formerly Y.RACF), Resource and Admission Control Functions in Next Generation Networks.

SUMMARY OF THE INVENTION

An advance is made over the prior art in accordance with the principles of the present invention that addresses the problem of authentication of the transport packet stream (which constitutes a flow within a session), which has been admitted into a managed packet network. Authentication and the subsequent enforcement of the flows supporting an identified client's authorized service prevent a large class of denial of service attacks described below. Specifically, the invention addresses two different matters: 1) key distribution and management 2) various forms of using a shared key for the authentication of transport packets on the user-to-network-interface (UNI).

In one embodiment of the invention, a method of authenticating a transport packet stream in a managed packet network is shown comprising the steps of receiving at a RACF (Resource and Admission Control Function) a request for service from a client application transmitted through a service control function and authenticating the transport packet stream, using a session key, based on session flow parameters associated with said transport packet stream without regard to identity of a client. Another embodiment includes a method of authenticating a transport packet stream in a managed packet network comprising the steps of receiving at a RACF a request for service from a client application transmitted through a service control function; authorizing the request from the service control function; creating a key, $K_F$, for a session flow to be established, $K_F$ being shared between said client application and a gateway; and passing a quantity (X or Y) to the service control function from which X can be determined, wherein X is included in a token to be passed to a client application, wherein a client can determine a session flow key $K_F$. Additional steps may include creating a ticket, t, for a border gateway to be contacted, where $t=K_{BGW}(F, K_F)$, wherein the quantity X which is passed to the client utilizes the ticket as part of an encrypted value.

BRIEF DESCRIPTION OF THE DRAWING

The teachings of the present invention can be readily understood by considering the following detailed description in conjunction with the accompanying drawings, in which.

DETAILED DESCRIPTION

As stated in the Summary, the invention addresses the problem of authentication of a transport packet stream (which constitutes a flow within a session), which has been admitted into a managed packet network (such as AT&T or Verizon packet networks). Authentication and the subsequent enforcement of the flows supporting an identified client's authorized service prevent a large class of denial of service attacks described below. Specifically, the invention addresses two different matters: 1) key distribution and management 2) various forms of using a shared key for the authentication of transport packets on the user-to-network-interface (UNI). Although the invention is described with respect to the Resource and Admission Control Function (RACF) and Service Control Function apparatus, it would be understood that other apparatus that include like functionality may also be utilized in connection with the present invention.

Figure 1:
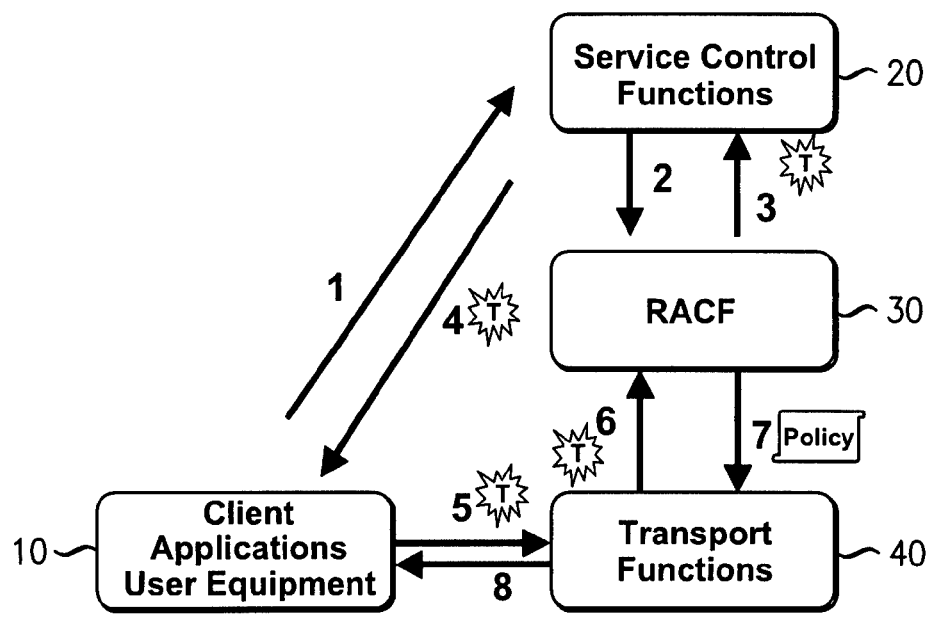
FIG. 1 shows a flow diagram for message flows according to a PULL model and the present invention.
Figure 2:
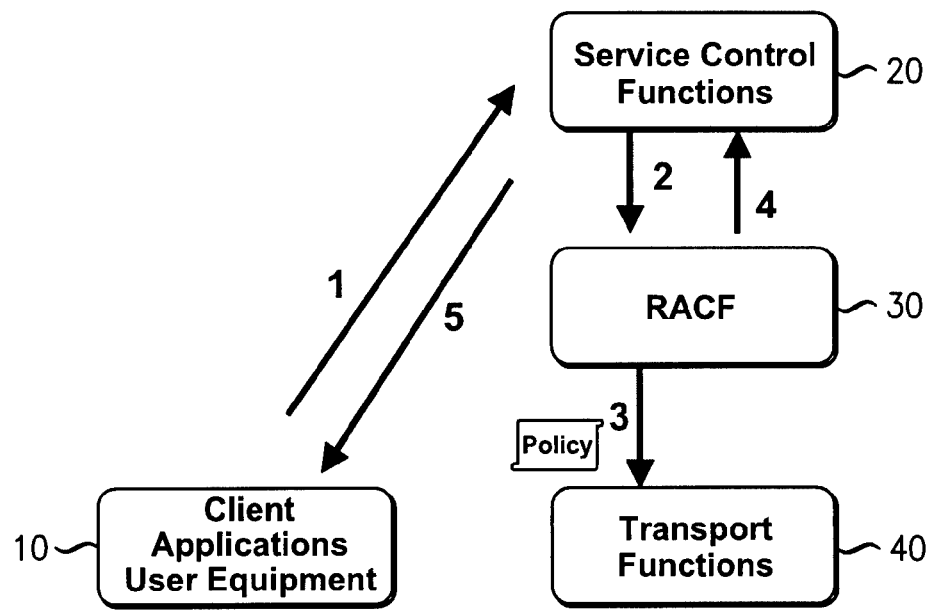
FIG. 2 shows a flow diagram for message flows according to a PUSH model and the present invention.

Referring to FIGS. 1 and 2, the entities involved in the process of authenticating a session, for example, are User Equipment terminal 10 (such as a computer, an IP wireline [fixed] or mobile telephone, or a set top box) which originates and receives the flows related to a service. As far as the terms of this invention are concerned, the invention considers a specific client service application running on a terminal and the flows that such client application generates toward the network;

Service Control Function 20 (such as P-CSCF or S-CSCF functions defined in IMS or a specialized service control equipment for delivery of IPTV);

RACF 30; and

Border Gateway (such as an IP router), which is responsible for policy enforcement and which is broadly designated as Transport Functions 40.

The standards outline two respective models of typical information exchange among these entities, which are augmented by the present invention. There are two modes of operation known as a pull model and a push model. They are depicted in FIGS. 1 and 2, respectively.

Referring to FIG. 1, with a pull model, certain exemplary message flows for an information exchange between the entities described are set forth using flow designations 1 through 8 as below:

1) The client application initiates a request for service to the service control function;
2) The service control function translates this request into specific traffic parameters and passes those to the RACF;
3) The RACF authorizes the request and makes the necessary reservations, returning to the service control function a standard token with additional information for the client application;
4) The service control function passes the authorization and the token to the client application;
5) The client application initiates signaling (such as the Resource reservation Setup Protocol [RSVP] reservation request), in which it passes the appropriate flow parameters and the token (which may contain the information necessary to locate the RACF) to the border gateway;
6) The border gateway requests the respective policy (based on the flow parameters) from the RACF;
7) The RACF supplies the requested policy; and
8) The client application receives confirmation, at which point the respective application client can start sending the packets within the flow.

Referring to FIG. 2, with a push model, an information exchange between the entities described are set forth using flow designations 1 through 5 as below 1) The client application initiates a request for service to the service control function;
2) The service control function translates this request into specific traffic parameters and passes it to the RACF;
3) The RACF authorizes the request and installs the respective policy in the border gateway;
4) The RACF replies to the service control function;
5) The service control function passes the authorization to the client application, upon receiving which the respective client application can start sending the packets within the flow.

Presently, the policy enforcement encompasses admission of an authorized flow based solely on the information in the network- and transport-layer headers of each packet: source and destination IP addresses and ports and the protocol number. Based on this information, the network may police the traffic by dropping (not admitting) the packets when the flow does not conform to agreed traffic specifications (e.g., traffic exceeds the data rate).

One problem with this approach is that, in the absence of the mechanism for authenticating every packet, it is possible (and deemed fairly easy) to stage a denial-of-service (DOS) attack, in which an attacker emits a flow with the same header information as a legitimate one and thus hinders or even fully denies the intended service. The same attack, especially if it involves multicast addresses (i.e., in case of an IPTV broadcast service) may deny service to a large group of recipients and ultimately to the service provider itself.

These types of attacks can be prevented if each packet is admitted only if it is positively authenticated. To enable that, the network and the end point must share a secret (i.e., a high-quality cryptographic key) for the session. If this goal is achieved, yet another problem is solved, namely the problem of providing the confidentiality and integrity on the UNI interface.

The present invention teaches how to achieve that goal within the RACF framework so that the session key distribution via a RACF-issued ticket is combined with standard authorization and resource admission control functions performed by the RACF.

The invention first augments the RACF with a key distribution function, so that the RACF shares the respective keys with each service control function and each border gateway with which it needs to interact. With that, the RACF can help interoperate a service control function in one network with a border gateway in another network.

The following are the cryptographic keys (such as the keys used in the Data Encryption Standard (DES)-, or triple-DES key) involved in the transactions below:

$K_{BGW}$ is a key shared between the RACF and border gateway;

$K_{SCF}$ is a key shared between the RACF and service control function;

$K_F$ is a key for the session flow to be established, which RACF creates so that it is shared between the subscriber client application and the gateway;

$K_S$ is a key shared between the subscriber and service control function; (In the case of the IMS, P-CSCF possesses this key.) If the service control function trusts the RACF (which should always be the case when both belong to the same network), it can supply the RACF with $K_S$ in step 2(common to both the pull and push models)

K(L) always denotes a string that is the result of the encryption of string L using a certain encryption algorithm and the key, K.

With the present invention, upon authorizing the request from the service control function, the RACF creates $K_F$ and computes a "ticket" to the BGW:

$$t = K_{BGW}(F, K_F),$$

where F is the flow identifier. In one exemplary embodiment of the invention, the session flow parameters are derived from the quintuple that contains the originating and terminating IP addresses and originating and terminating port numbers along with the protocol identifier.

Then, in step 3 of the pull model or step 4 of the push model, there are two alternatives that depend on the trust model chosen between the entities in the network:

1) If the RACF has $K_S$, it will pass to the service control function the quantity $X = K_S(K_F, F, t)$; or,
2) Otherwise, the RACF will pass to the service control function the quantity $Y = K_{SCF}(K_F, t)$. On receiving this quantity, the service control function will decrypt it and compute $X = K_S(K_F, F, t)$. In this case, RACF does not need to know the key shared between the subscriber and service control function. The quantity X is then included in the token T and passed to the client application in step 4 of the pull model. The step 5 of the push model may be augmented to include X.

In addition, the invention envisions the case where $K_S$ is shared only by the RACF and the client (but not the service control function). Then case 1) can actually protect the session key from the service control function. This option may be considered in certain deployment scenarios.

Upon receiving X, the client application extracts from it $K_F$ and t, and then—in step 5 of the pull model—it includes in the token T the quantity Y=[t, $K_F$(timestamp)] and sends it to the border gateway as part of the session initiation process.

When the border gateway receives it and determines that the timestamp is fresh, it replies—in step 8 of the pull model—with the authenticator A=$K_F$(timestamp+1).

The push model can be augmented with the above exchange. Alternatively, the RACF can simply deliver the key to the border gateway in step 3. In this case, the ticket is not used and the quantity X is computed as follows:

$$X=K_S(F,K_F).$$

From now on, each packet in the flow can be authenticated using any existing mechanism (such as hashed message authentication code [HMAC]) that uses the shared key. The use of HMAC in the message authentication code is a standard practice. It is accomplished as follows: When a principal A sends a message M to a principal B, A computes a quantity H(M, K), which is the hash of a certain function $f$(M, K) of M and the shared key, K, and then attaches this quantity to the message. Thus what is really sent is [M, H(M, K)]. When B receives a message (M', Q), B computes H(M', K) and checks whether it is equal to Q. If it is, then B knows that only A could send this message because only A knows K.

To further protect against the replay, the present invention contemplates that such mechanisms must include time stamping. One way of achieving this is for both principals—the user equipment and border gateway—to remember the initial value of timestamp so that each subsequent packet i in the flow computes HMAC on the string that includes the quantity timestamp+i.)

Envisioning particularly long sessions, this invention employs a mechanism to regenerate $K_F$. For this, a special timer, $T_F$, is associated with a key, $K_F$, at the time it is generated. When this timer expires, the key generation and distribution procedure is repeated. To ensure that both principals transition flawlessly to using the new key, this invention defines the transition timer, $\Delta_F$. The latter defines the time period when both the old and the new keys are valid. To employ these timers, the clocks of the principals must be synchronized. This can be achieved by using the Network Time Protocol (NTP) or the global position system.

The invention also envisions a related problem, which is that the $K_S$ can be changed, too. If this key is used, the service control function is responsible for provisioning RACF with it when it has changed. Such a change, however, does not have an effect on the existing session.

The session key, $K_F$, once established, can be also used for integrity protection or confidentiality on the segment between the end-user's terminal and the border gateway.

Figure 3:
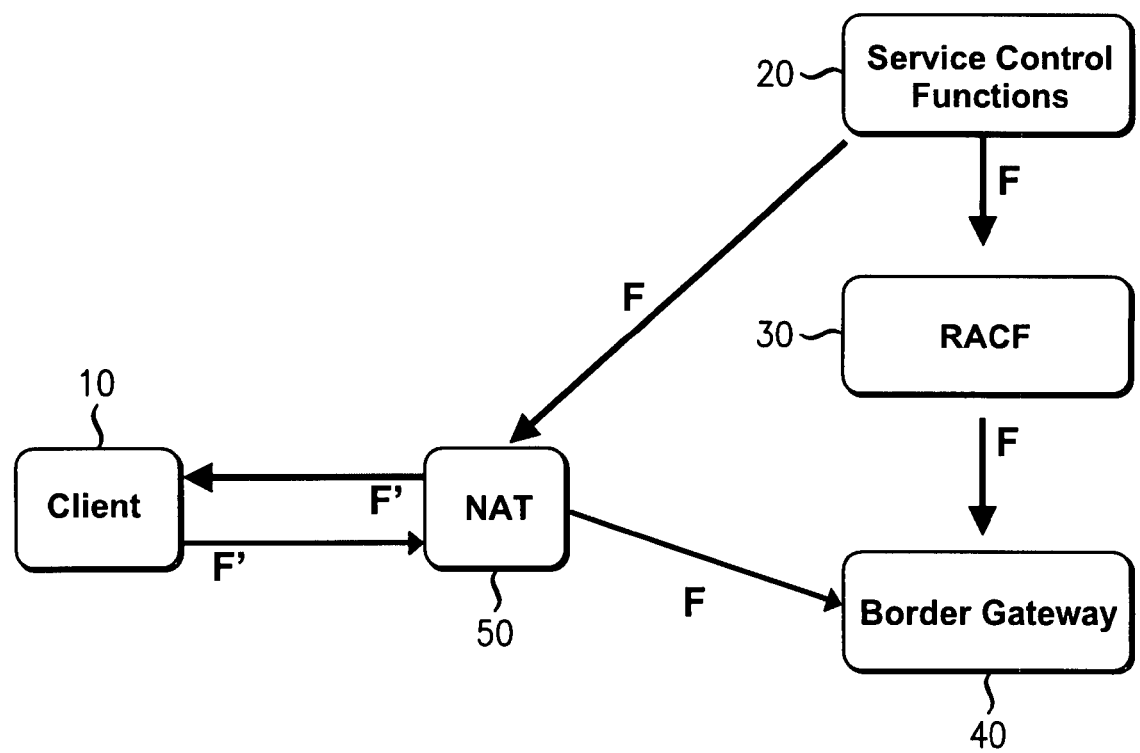
FIG. 3 shows an exemplary message flow in accordance with the present invention that addresses NAT.

This invention has also provided a solution to a problem when a certain class of the Network Address Translation (NAT) devices that are application aware (such as a SIP-aware NAT or another application-level gateway) is employed at the home or enterprise network where the subscriber is located. The problem description is accompanied by FIG. 3. Here, as before, the service control function 20 identifies—and passes to the RACF 30 and the client 10—the flow F. But the NAT device 50 modifies F; the new value, F', which is passed to the client is constructed so that NAT translates it to F. In this case, the client may not use F' for authentication; however, since it had received F in the ticket (which is not changed by NAT), it can use the correct quantity in the HMAC calculation.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A method of authenticating a transport packet stream in a managed packet network comprising the steps of:

receiving at a RACF (Resource and Admission Control Function) a request for service from a client application transmitted through a service control function;

authenticating each packet of said transport packet stream, using a session key, based on session flow parameters associated with said transport packet stream without regard to identity of a client;

creating at said RACF a session key, $K_F$, for a session flow F to be established; passing a quantity to the service control function from which another quantity X can be determined, wherein X is included in a token to be passed to said client application, wherein said session key is determined from X;

and creating a ticket, t, for a border gateway to be contacted, where t=$K_{BGW}$(F, $K_F$), wherein $K_{BGW}$ is a key shared between the RACF and border gateway.

2. The method of claim 1, wherein the quantity X which is passed to the client utilizes the ticket as part of an encrypted value.

3. The method of claim 1, wherein a subscriber key, used to authenticate, is shared only between the RACF and client.

4. The method of claim 2, wherein a token T is passed from the client application to a border gateway as part of a session initiation process, wherein T includes the quantity [t, $K_F$(timestamp)].

5. The method of claim 4, wherein the border gateway authenticates the session if the timestamp is within a given time.

6. The method of claim 5, wherein the user equipment and border gateway store an initial timestamp value in order to protect against replay after a given time period has passed.

7. The method of claim 1, wherein the method is applicable for use with Network Address Translation devices.

8. The method of claim 1, wherein the session flow parameters are derived from the quintuple that contains the originating and terminating IP addresses and originating and terminating port numbers along with the protocol identifier.

9. A method of authenticating a transport packet stream in a managed packet network comprising the steps of: receiving at a RACF a request for service from a client application transmitted through a service control function, authorizing the request from the service control function; creating a key, $K_F$, for a session flow to be established, $K_F$ being shared between said client application and a gateway; passing a quantity (X or Y, from which X can be determined) to the service control function, wherein X is included in a token to be passed to a client application, wherein a client determines a session flow key $K_F$; and creating a ticket, t, for a border gateway to be contacted, where $t=K_{BGW}(F, K_F)$, wherein the quantity X which is passed to the client utilizes the ticket as part of an encrypted value, wherein $K_{BGW}$ is a key shared between the RACF and border gateway.

10. A resource and control function apparatus comprising: a processor operable to receive a request for service from a client application transmitted through a service control function; and authenticating each packet of said transport packet stream, using a session key, based on session flow parameters associated with said transport packet stream without regard to identity of a client;

said apparatus is further operable to create a session key, $K_F$, for a session flow to be established; pass a quantity to the service control function from which another quantity X can be determined, wherein X is included in a token to be passed to said client application, wherein said session key can be determined from X; create a ticket, t, for a border gateway to be contacted, where $t=K_{BGW}(F, K_F)$, wherein the quantity X which is passed to the client utilizes the ticket as part of an encrypted value, wherein $K_{BGW}$ is a key shared between the RACF and border gateway.

11. The method of claim 1, further including a timer, $T_F$, associated with the key, $K_F$, at the time it is generated, wherein the key generation and distribution procedure is repeated, when the timer expires, further including a transition timer, $\Delta_F$, wherein the transition timer defines a time period when both the old and new keys are valid.

12. A method of authenticating a transport packet stream in a managed packet network comprising the steps of:

receiving at a RACF (Resource and Admission Control Function) a request for service from a client application transmitted through a service control function;

authenticating each packet of said transport packet stream, using a session key, based on session flow parameters associated with said transport packet stream without regard to identity of a client;

wherein the service control function passes an authorization to the client application, upon receiving which respective client application can start sending the packets within the flow, wherein a quantity X is included in a token to be passed to said client application, wherein a session key for authentication is determined from X;

and creating at said RACF a session key, $K_F$, for a session flow F to be established; and creating a ticket, t, for a border gateway to be contacted, where $t=K_{BGW}(F, K_F)$, wherein t is used to determined the quantity X, wherein $K_{BGW}$ is a key shared between the RACF and border gateway.

* * * * *